Aug. 4, 1942.   J. M. PISTEY   2,292,084
MOUNTING MEANS FOR ELECTRICAL RECEPTACLES
Filed March 20, 1942
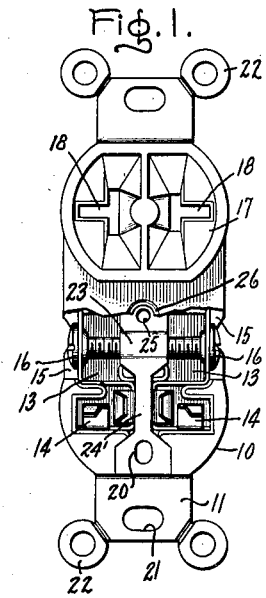
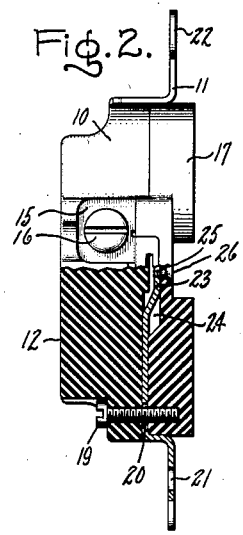
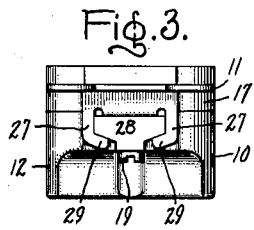
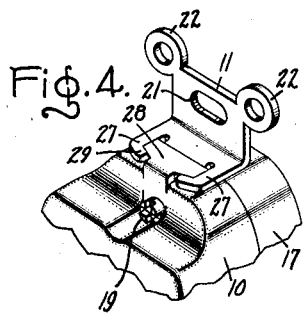
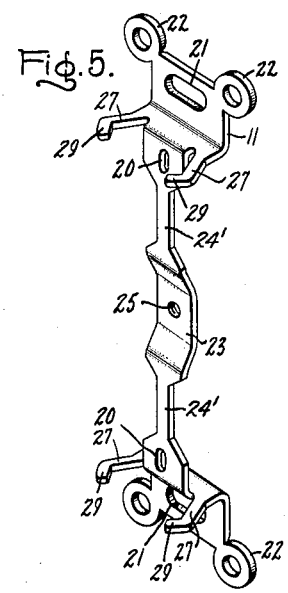
Inventor:
John M. Pistey,
by Harry E. Dunham
His Attorney.

Patented Aug. 4, 1942

2,292,084

UNITED STATES PATENT OFFICE 2,292,084

MOUNTING MEANS FOR ELECTRICAL RECEPTACLES

John M. Pistey, Fairfield, Conn., assignor to General Electric Company, a corporation of New York Application March 20, 1942, Serial No. 435,471

1 Claim. (Cl. 174—53)

This invention relates to mounting means for electrical devices and more particularly to a mounting strap for supporting an electrical receptacle, or the like, in a wall box.

The object of the invention is to provide a new and improved mounting strap for electrical receptacles so fastened to the receptacle that it cannot become loosened thereon. The mounting strap is so constructed and arranged that the receptacle may be firmly and securely positioned within a wall box so that it will not be dislodged by pulls or pushes incident to mounting an electrical plug therein.

In the accompanying drawing, Fig. 1 is a plan view of the receptacle with a portion broken away to show the interior construction; Fig. 2 is a side view of the receptacle with a portion broken away to show the manner in which the mounting strap is positioned on the receptacle; Fig. 3 is an end view of the receptacle and mounting strap; Fig. 4 is a perspective view of a portion of the mounting strap and receptacle, and Fig. 5 is a perspective view of the mounting strap.

Referring to the drawing, Figs. 1 and 2 illustrate an electrical receptacle of the type used for wall mounting in building wiring systems. It is formed with a housing 10 of insulating material, such as a molded plastic, and a mounting strap 11 for mounting the receptacle in a wall box of the wiring system. The housing 10 is in two parts and includes a base portion 12 provided with recesses 13 extending inwardly from the front of the base, as viewed in Fig. 1, which receive spaced contact members 14. In order to make an electrical connection with the conductors of the wiring system, a portion of the contact members is exposed at the side of the receptacle, as indicated at 15, and is provided with terminal screws 16. The other part of the housing comprises a cover 17 which closes the recesses 13 and maintains the contact members in place. The cover is provided with spaced openings 18 for receiving the contact prongs of an electrical plug cap to guide them into engagement with the contact members.

In order to support the mounting strap on the receptacle housing 10, it is sandwiched in between the base 12 and the cover 17, in a manner shown most clearly by Fig. 2 and is clamped between these two members. The cover is secured to the base by drive pins 19 which are located at opposite ends of the base although only a single pin has been shown in Fig. 2. These drive pins extend from the rear of the base through openings 20 in the mounting strap and are tapped into the cover 17; they may be self threading drive pins.

Portions of the mounting strap 11 extend outwardly from opposite ends of the receptacle and are provided with openings 21 which are adapted to receive mounting screws for securing the mounting strap to an electrical wall box. In order to position the receptacle properly with respect to the wall surface, the mounting strap is provided with ears 22 which engage the plaster or wall board forming the material of the wall and position the receptacle properly with regard to the surface of the wall so as to take care of any inaccuracies in the location of the wall box. A central portion 23 of the mounting strap is deflected out of the plane of the strap and projects into a recess 24 in the cover 17. This central portion is provided with a threaded opening 25 which mates with an opening 26 in the cover, the assembly being adapted to receive the screw which holds a face plate in position on the receptacle. In this way, the face plate is grounded through the mounting strap and wall box. Portions of the strap are reduced in width, as indicated at 24', to provide for clearance between the contact members.

The receptacle thus far described is one which comprises relatively few parts. It is one which may be manufactured at low cost since the mounting strap is simply clamped between the parts of the housing without the necessity of using separate fastening means such as screws, or the like. While the drive pins provide a simple and effective means for holding the assembly together and do not require molded inserts in the cover to receive them, it is frequently desirable to provide additional means for anchoring the mounting strap in position on the holder. This avoids the possibility of heavy pulls or twists on the receptacle from loosening the drive pins.

To this end, the mounting strap is provided with additional fastening means in the form of spaced arms 27 punched from the metal of the strap and which extend downwardly from the plane of the strap at opposite ends thereof at points adjacent the extending portions which mount the strap on a wall box. The arms straddle a projection 28 formed integrally on each end of the base 10 and the ends of the arms are bent inwardly to form claws 29 which engage abutment surfaces 30 forming part of the projection. The mounting strap is formed as shown in Fig. 5 with the arms spaced apart at an angle and is then secured in position on the base 10 by bending the arms 21 together around the projection to the position shown by Figs. 3 and 4.

The additional anchoring means provide a construction in which the mounting strap is securely fastened to the base of the receptacle housing independently of the fastening pins 19 and, in addition, provide a construction which holds the receptacle rigidly in position on a wall box. This is due in part to the fact that the clamping arms are formed immediately adjacent the box engaging portions of the strap. Even though the screws 19 become loosened due to cracking of the cover under a blow, the receptacle will still be firmly held in position in the wall box.

What I claim as new and desire to secure by Letters Patent of the United States is:

In an electric receptacle, a two-part housing of insulating material comprising a base and a cover, a mounting strap disposed between said base and cover and having portions extending beyond opposite ends of said housing for engaging a wall box, means for securing said base and cover together to clamp said strap therebetween, projections extending outwardly from opposite ends of said base, and a pair of spaced arms formed integrally on the extending portions of said mounting strap at opposite ends thereof and engaging said projections to clamp the opposite ends of said mounting strap to said base at points adjacent said extending portions.

JOHN M. PISTEY.